July 18, 1950 T. H. LENNOX 2,515,781
ELECTRIC HEATING UNIT
Filed April 23, 1949
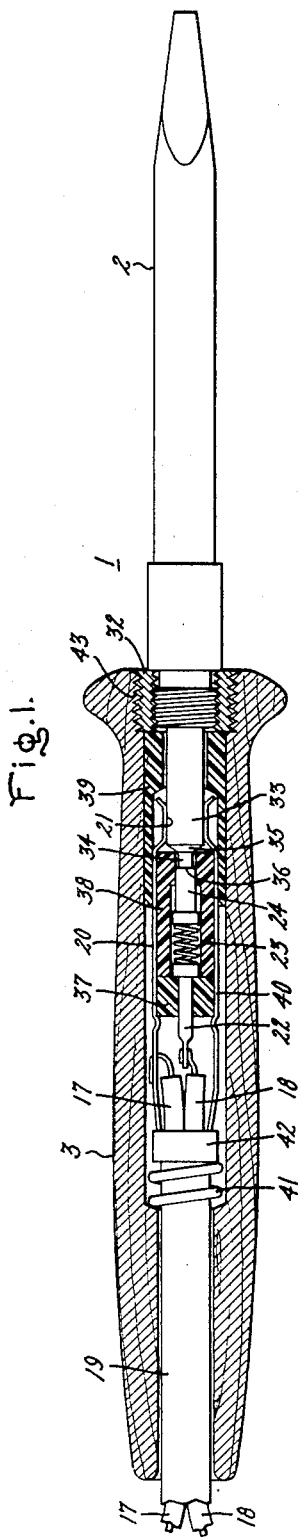
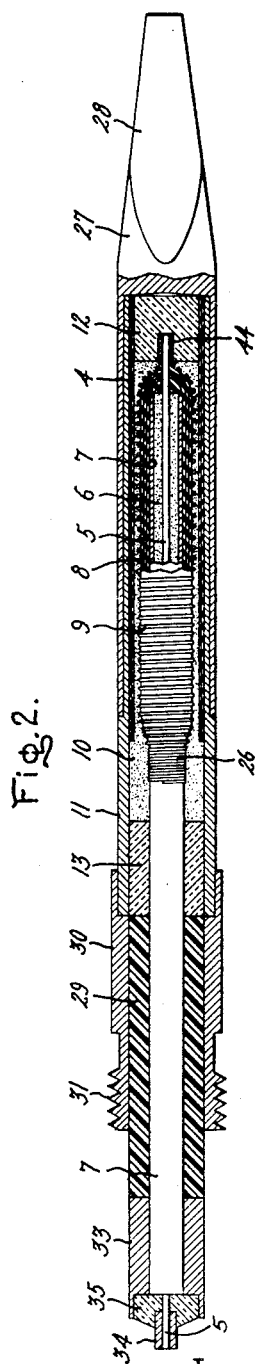
Inventor:
Thomas H. Lennox,
by [signature]
His Attorney.

Patented July 18, 1950

2,515,781

UNITED STATES PATENT OFFICE 2,515,781

ELECTRIC HEATING UNIT

Thomas H. Lennox, Pittsfield, Mass., assignor to General Electric Company, a corporation of New York Application April 23, 1949, Serial No. 89,284

6 Claims. (Cl. 201—67)

My invention relates to electric heating units, more particularly to electric heating units in which the heating element is entirely enclosed and to methods of constructing such heating units.

An object of my invention is the provision of a durable heating unit of this type which is sealed against the entry of moisture and other foreign materials which would harm the heating element.

Another object of the invention is the provision of a heating unit having an enclosed heating element which is adaptable for use in midget soldering irons, small immersion heaters, and other related small heating devices.

A still further object of my invention is to provide a heating unit having the above-mentioned features which is inexpensive to manufacture in large quantities.

In carrying out my invention in one form, I provide a concentrically constructed heating unit having a wire along the center line serving as an electrical conductor. The center wire is covered by a layer of insulation on the outside of which is a length of metal tubing serving as a second electrical conductor. Around a portion of the metal tubing, including one extremity, is another layer of insulation. On the outer surface of this second layer of insulation is located a helical heating coil of high resistance wire. One end of the heating coil is securely connected to the center wire at one extremity thereof with the other end of the heating coil being securely connected to the outer surface of the metal tubing at an intermediate point. All these component parts are concentrically positioned in an outer tubular metal sheath with a layer of compacted magnesium oxide powder separating the inner assembly of component parts from the outer sheath. The sheath has a retaining member of insulating material closing off one end and a suitable retaining member and provision for electrical connections at the other end thereof.

For a more complete understanding of my invention, reference should be had to the accompanying drawing, Fig. 1 of which is an enlarged view, partially in section, of a soldering iron in which is incorporated a heating unit embodying my invention; while Fig. 2 is an enlarged sectional view of the soldering tip end of the soldering iron showing in detail the concentric construction of the heating unit and other features of my invention.

Referring to Fig. 1 of the drawing, there is shown a soldering iron, designated generally by the numeral 1, which is composed of two principal parts: a soldering tip 2, which encloses a heating unit constructed in accordance with my invention, and a handle 3, which encloses the electrical connections to the heating unit. This soldering iron is claimed in my divisional application, Serial No. 141,467, filed January 31, 1950.

The heating unit, which is illustrated in detail in Fig. 2, comprises a center electrical conductor 5 which may, for example, be made of iron wire. Surrounding wire 5 is a coaxial layer 6 of electrical insulating material which is preferably compacted magnesium oxide powder. Concentrically located around the insulation layer 6 is a tubular electrical conductor 7 of a heat resistant material which may, for example, be an alloy containing iron, cobalt and nickel. In one typical heating unit embodying my invention, tube 7 has an outside diameter of approximately .130 inch.

Around the outer surface of tubular member 7 along a portion thereof adjacent to the extremity opposite the handle is a coaxial layer 8 of electrically insulating material. Layer 8 may, for example, comprise several thicknesses of insulating paper wrapped around member 7 with additional thicknesses over the extremities of member 7 and insulating layer 6 in the manner illustrated in Fig. 2. On the outside of insulation layer 8 is located a helical coil 9 of resistance heating wire which is preferably made of an alloy of nickel and chromium. At one end 26 of the heating coil, there are several turns of wire wound on to the outside surface of member 7, while at the other end 44, several turns are coiled about center wire 5.

Immediately surrounding metal tube 7 and heating coil 9 is a coaxial layer of electrically insulating heat conductive material 10 such as compacted magnesium oxide powder. Around insulating layer 10 and enclosing all the foregoing component parts is an outer tubular metal sheath 11, preferably made of an alloy of iron, cobalt and nickel. If desired, a liner 4 of mica may be provided inside sheath 11 along the portion adjacent the heating coil. At the ends of sheath 11 are retaining members 12 and 13, which may be of baked lava, whose primary purpose is to retain insulating material 10 during and after the swaging operation, which is explained below.

At the end of the heating unit opposite the handle end, the soldering iron 1 is equipped with a copper tip portion 27 having a tapered wedge-shaped extremity. On this tapered wedge-shaped extremity are provided the actual soldering surfaces, such as the area designated by the numeral 28, for example. All, or a part of the outer surface of copper tip 27 may be iron-plated, if desired, to reduce the corrosive effect on the tip of the tin which is contained in solder.

At the end of the heating unit adjacent to the handle, the soldering iron 1 is provided with means for affixing the heating unit to handle 3 and for connecting the heating unit to a source of electrical energy. A cylindrical layer 29 of electrical insulation, which may, for example, be of ceramic material, surrounds tubular conductor 7 at this end of the heating unit. A cylindrically-shaped member 30, having a threaded portion 31, is positioned outside of layer 29 overlapping the end of sheath 11. The threaded portion 31 engages corresponding threads on the inner surface of a member 32 at the extremity of handle 3, and thereby joins the heating unit to the handle. At the inner extremity of insulator 29, there is a cylindrical member 33 of electrically conducting material, the outer surface of which provides a contact for electrical connections to tubular conductor 7. Another smaller cylindrical contact member 34 is provided at the inner extremity of center conductor 5 to provide for electrical connections thereto, with contacts 33 and 34 being separated by a suitable insulator 35 which is preferably of glass.

Referring to Fig. 1, the heating unit in this typical soldering iron is connected to a source of electrical energy (not shown) by two insulated conductors 17 and 18 which are located within a protective outer sheath 19. Conductor 17 is joined to a conductive prong member 20, of resilient material, which is in contact with member 33 at location 21 when the heating unit is in the handle, thus completing an electrical connection to conductor 7 of the heating unit. Conductor 18 is joined to a member 22, from which an electrical connection is completed to center conductor 5 of the heating unit through a coil spring 23 and a slidable contact member 24. This electrical connection is made at point 36 when the heating unit is screwed into the handle.

There are provided within the handle three cylindrically shaped insulators, 37, 38 and 39, which are preferably of plastic material. These insulators separate the two sides of the electrical circuit from each other and from the handle, as shown in Fig. 1. A resilient member 40, which is similar to member 20, and other like resilient members (not shown) are provided around the outer periphery of insulators 37 and 38 to maintain the parts within the handle in the proper concentric relation. A coil spring 41 coacts with a projection 42 at the inner extremity of sheath 19 to absorb a portion of the strain on the electrical connections within the handle caused by tension on the cable made up of sheath 19 and conductors 17 and 18. Member 32, which joins the heating unit to the handle, is secured within the handle 3 by means of threads 43. In addition to joining the heating unit and the handle, member 32 also serves as a retainer for the insulators and other parts within handle 3.

To construct a heating unit in accordance with my invention, I first provide a suitable length of preformed concentric electrical conductor comprising center wire 5, insulation layer 6 and outer conductor 7. The first step in the manufacturing operation is to remove a portion of outer conductor 7 and insulation layer 6 at each end of center conductor 5. Several thicknesses of insulating paper 8 are then wound around the outside surface of member 7 and down over one extremity of member 7 on to conductor 5, as illustrated in Fig. 2. Heating coil 9 is then wound on the outer surface of insulation layer 8 with several turns wound off on member 7 at one end 26 and several turns wound on to member 5 at the other end 44 of the heating coil. Following the winding of the heating coil, the end turns of the coil lying on members 7 and 5, respectively, are staked in order to form good electrical and mechanical connections between the coil and these members.

The assembled components described in the preceding paragraph are then placed concentrically inside outer sheath 11 and the intervening space is filled with magnesium oxide powder. Retainers 12 and 13 are inserted at the ends of sheath 11 to prevent the magnesium oxide powder from coming out during the subsequent swaging operation. Member 12 has a centered opening on the inner side to admit portion 44 of the heating coil assembly, and the aperture through member 13 is also at the center so that members 12 and 13 serve to maintain the heating coil assembly on the center line of sheath 11.

After assembly in the manner described, the heating unit is swaged to compact the layer 10 of magnesium oxide powder and reduce the diameter of sheath 11 to a predetermined value which may, for example, be .285". Sheath 11 is then machined at one extremity to provide for the addition of soldering tip 27 if the heating unit is to be used in a soldering iron, and the soldering tip is installed. At the other end of the heating unit, members 29 and 30 are installed in this order, after which cylindrical contact 33 is placed on tubular conductor 7 and secured thereto. Then center contact member 34 is added and a glass seal 35 is provided between contact members 33 and 34 by the use of high frequency current to heat the glass. The heating unit is then ready to be screwed into handle 3, after which electrical current may be circulated through the heating coil 9 to cause it to dissipate heat. The circuit which the current follows through the soldering iron 1, in which this typical heating unit is incorporated, may be traced as follows, assuming that conductor 17 is the forward conductor and conductor 18 the return conductor: conductor 17, member 20, contact member 33, tubular conductor 7, heating coil 9, center conductor 5, contact member 34, member 24, spring 23, member 22, and conductor 18.

While I have illustrated and described the heating unit of my invention in a preferred form for use in a soldering iron, it will be readily apparent that this heating unit may be used for many purposes, such as immersion heaters, electric ranges and the like. The heating unit is straight in this preferred embodiment but it is adaptable for use in other forms. The terminal arrangement of the heating unit may be modified to adapt it for use in heating devices other than soldering irons. Therefore, while I have illustrated and described one preferred embodiment of my invention, many modifications may be made, and, accordingly, it should be understood that I intend to cover, by the appended claims, all modifications which fall within the true spirit and scope of my invention.

What I claim as new and desire to secure by Letters Patent of the United States is:

1. A concentrically disposed heating unit comprising a center electrical conductor, a coaxial layer of electrically insulative material around said center conductor, a tubular electrical conductor coaxially positioned around said layer of insulative material, a second layer of electrically insulative material coaxially positioned on the outside surface of said tubular conductor, a resistance heating coil positioned on the outside of the said second layer of insulative material, one end of said coil being connected to said tubular conductor and the other end being connected to said center conductor, and a layer of electrically insulating heat conductive material coaxially positioned around all of the foregoing components embedding them within an outer metal sheath.

2. A concentrically disposed heating unit comprising a first electrical conductor, a first layer of electrically insulative material concentrically positioned around said first conductor, a second electrical conductor concentrically positioned around said first layer of insulative material a second layer of electrically insulative material concentrically positioned around said second electrical conductor, a resistance heating coil positioned around said second layer of insulative material, one end of said coil being connected to said first conductor and the other end being connected to said second conductor, and a layer of electrically insulating heat conductive material concentrically positioned around all of the foregoing components embedding them within an outer metal sheath.

3. An electrical heating unit comprising a length of electrically conductive wire, a layer of electrically insulative material coaxially positioned around said wire, a tubular member of electrically conductive material positioned immediately outside said layer of insulative material, a second layer of electrically insulative material around said tubular member for a portion of the length of said tubular member including one extremity thereof, a helical coil of high resistance electric heating wire positioned on the outside of said second layer of insulative material, said coil having one end connected to said tubular member and its other end connected to said center wire at one extremity thereof, a layer of compacted magnesium oxide powder coaxially positioned around all of the foregoing component parts, an outer metal sheath surrounding completely, except at one extremity, all of the foregoing component parts including said magnesium oxide powder, said metal sheath having an inner lining of mica in the portion adjacent to said heating coil, and a pair of retainers at the ends of said sheath to retain said powder within said sheath, said center wire and said tubular member projecting through one of said retainers.

4. The method of making an electrical heating unit which comprises providing a short length of coaxial electrical conductor having a center conductor separated by a layer of electrically insulative material from an outer conductor, locating around a portion of the length of said outer conductor a second layer of electrically insulative material, placing around said second layer a helical heating coil, connecting one end of said coil to said outer conductor and the other end of said coil to said center conductor, locating the foregoing assembled components inside a tubular sheath, filling the space between said sheath and said assembled components with powdered electrically insulating heat conductive material, and swaging said sheath to reduce the diameter thereof and compact said powdered material.

5. The method of making a heating unit which comprises providing a length of concentric electrical conductor having a center conductor separated by a layer of insulative material from an outer conductor, locating around a portion of said outer conductor including one extremity a second layer of electrically insulative material, placing around said second layer a resistance heating coil, connecting one end of said coil to said outer conductor and the other end of said coil to said center conductor, locating the foregoing assembled components inside a metal sheath, filling the space between said sheath and said assembled components with powdered electrically insulating heat conductive material, and swaging said sheath to reduce the cross-sectional area thereof and compact said powdered material.

6. The method of forming an electrical heating unit which comprises placing a layer of electrically insulative material around a length of electrically conductive wire, installing a length of electrically conductive tubing outside said insulative material, placing a second layer of electrically insulative material around said tubing for a portion of the length thereof including one extremity, winding a coil of resistance heating wire on the outer surface of said second insulative layer, winding one end of said coil off onto said tubing, winding the other end of said coil off onto said center wire adjacent said extremity, inserting the foregoing assembled component parts in a length of tubular metal sheath of sufficient diameter to provide a radial space between said assembly and said sheath at all points, filling said radial space with powdered electrically insulating heat conductive material while maintaining said component assembly in a substantially centered position, installing retainers to retain said powdered material within said sheath, and swaging the complete assembly including said sheath to reduce the diameter of said sheath and compact said powdered heat conductive material.

THOMAS H. LENNOX.

REFERENCES CITED

The following references are of record in the file of this patent:

UNITED STATES PATENTS

| Number | Name | Date |
| --- | --- | --- |
| 1,959,047 | Bollman | May 15, 1934 |
| 1,972,193 | Kerka | Sept. 4, 1934 |
| 1,994,119 | Weatherby | Mar. 12, 1935 |
| 2,053,933 | Abbott | Sept. 8, 1936 |
| 2,064,248 | Doyon | Dec. 15, 1936 |
| 2,198,877 | Kuhn et al | Apr. 30, 1940 |
| 2,274,408 | Hampton et al. | Feb. 24, 1942 |
| 2,283,023 | Williams et al. | May 12, 1942 |
| 2,451,102 | Litke | Oct. 12, 1948 |
| 2,455,186 | McCormick | Nov. 30, 1948 |